US010765974B2

(12) United States Patent
Renz et al.

(10) Patent No.: US 10,765,974 B2
(45) Date of Patent: Sep. 8, 2020

(54) LINT COLLECTION ASSEMBLY FOR A DRYER APPLIANCE

(71) Applicant: Haier US Appliance Solutions, Inc., Wilmington, DE (US)

(72) Inventors: Daniel Stephen Renz, Louisville, KY (US); Peter Heiniger, Louisville, KY (US); Grafton Cook, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/257,159

(22) Filed: Jan. 25, 2019

(65) Prior Publication Data

US 2020/0238202 A1 Jul. 30, 2020

(51) Int. Cl.
*B01D 29/09* (2006.01)
*D06F 58/22* (2006.01)

(52) U.S. Cl.
CPC ............. *B01D 29/09* (2013.01); *D06F 58/22* (2013.01); *B01D 2201/26* (2013.01)

(58) Field of Classification Search
CPC .......... D06F 58/20; D06F 58/10; D06F 58/02; B01D 29/09; B01D 2201/26
USPC ............................................ 34/480, 595–610
See application file for complete search history.

(56) References Cited

U.S. PATENT DOCUMENTS

| | | | |
|---|---|---|---|
| 3,263,343 A | 8/1966 | Loos | |
| 4,033,047 A * | 7/1977 | Kawai | D06F 58/02 34/82 |
| 4,294,597 A * | 10/1981 | Archer | B01D 46/26 55/283 |
| 4,621,438 A * | 11/1986 | Lanciaux | D06F 58/06 34/77 |
| 4,899,462 A * | 2/1990 | Putnam | D06F 58/02 34/428 |
| 5,062,219 A * | 11/1991 | Harris | D06F 58/02 34/242 |
| 5,210,960 A | 5/1993 | Len Larne | |
| 5,228,022 A * | 7/1993 | Compton | G11B 23/505 15/347 |
| 5,669,157 A * | 9/1997 | Kuipers | D06F 95/00 34/109 |
| 5,701,684 A | 12/1997 | Johnson | |
| 5,787,606 A * | 8/1998 | Bokholdt | D06F 58/203 34/527 |
| 6,811,685 B2 | 11/2004 | Wanni et al. | |

(Continued)

FOREIGN PATENT DOCUMENTS

EP 1050619 A1 11/2000
EP 2055825 A1 5/2009
(Continued)

*Primary Examiner* — Stephen M Gravini
(74) *Attorney, Agent, or Firm* — Dority & Manning, P.A.

(57) ABSTRACT

A lint collection assembly for a dryer appliance includes a filter housing defining an aperture through which a flow of air exits the drying chamber. A roller assembly includes a supply roller for unrolling clean filter medium over the aperture and a collection roller for simultaneously receiving a used section of the filter medium. A drive mechanism, such as an electric motor is coupled directly to the collection roller or to a separate drive roller for moving the filter medium over the aperture between drying cycles to automatically and conveniently collect filtered lint.

20 Claims, 8 Drawing Sheets

(56) References Cited

U.S. PATENT DOCUMENTS

| | | | | |
|---|---|---|---|---|
| 9,194,073 | B2* | 11/2015 | Kwon | D06F 29/005 |
| 9,885,145 | B2* | 2/2018 | Bae | D06F 58/22 |
| 9,896,797 | B2* | 2/2018 | Shin | D06F 58/02 |
| 9,920,469 | B2* | 3/2018 | Ramprasad | D06F 58/22 |
| 9,982,384 | B2* | 5/2018 | Shin | D06F 58/20 |
| 10,280,552 | B2* | 5/2019 | Kulkarni | D06F 58/22 |
| 10,280,553 | B2* | 5/2019 | Shin | D06F 58/24 |
| 10,329,708 | B2* | 6/2019 | Shin | D06F 58/02 |
| 10,526,745 | B2* | 1/2020 | Dunn | D06F 58/02 |
| 10,544,539 | B2* | 1/2020 | Bocchino | D06F 58/22 |
| 10,590,593 | B1* | 3/2020 | Leibman | D06F 58/22 |
| 2018/0245273 | A1* | 8/2018 | Bocchino | D06F 58/22 |
| 2019/0249355 | A1* | 8/2019 | Park | D06F 58/24 |
| 2019/0323163 | A1* | 10/2019 | Dunn | D06F 58/04 |
| 2020/0102692 | A1* | 4/2020 | Leibman | G05D 1/0225 |

FOREIGN PATENT DOCUMENTS

| | | |
|---|---|---|
| JP | 2006271829 A | 10/2006 |
| KR | 101241899 B1 | 3/2013 |

\* cited by examiner

LINT COLLECTION ASSEMBLY FOR A DRYER APPLIANCE

FIELD OF THE INVENTION

The present subject matter relates generally to dryer appliances, and more particularly to systems and methods for removing lint from a lint filter of a dryer appliance.

BACKGROUND OF THE INVENTION

Dryer appliances are generally provided with a filter for collecting lint and other particles from air flowing through the dryer appliances. During a drying cycle, a large volume of lint can collect on the filter. Lint disposed on the filter can restrict air flow through the dryer appliance and negatively affect performance of the dryer appliance. For example, restricted air flow through a drum of the dryer appliance can raise a temperature of air within the drum and damage clothing articles within the drum. As another example, a thermostat or other temperature regulating device of the dryer appliance may trip due to the increased temperature within the drum causing the drying cycle to be extended. Thus, the efficiency of the dryer appliance may be negatively affected or the drying performance may be impaired when excessive lint is disposed on the dryer appliance's filter.

As a result, users of dryer appliances are normally instructed to manually clean the filter and remove collected lint from the filter between drying cycles. However, it can be difficult and/or inconvenient to frequently remove lint from the filter, and certain consumers forget to regularly clean the filter and/or find the process tedious and disregard the cleaning instructions. In addition, in certain circumstances objects such as dryer sheets, foreign materials, or other particles and debris can cause stubborn clogs in the lint filter which may be difficult to dislodge.

Accordingly, a dryer appliance and associated methods of operation that facilitate improved lint removal and collection would be useful. More specifically, a dryer appliance with features for removing lint from a filter of the dryer appliance and storing the lint for multiple drying cycles would be particularly beneficial.

BRIEF DESCRIPTION OF THE INVENTION

Aspects and advantages of the invention will be set forth in part in the following description, or may be obvious from the description, or may be learned through practice of the invention.

In one aspect of the present disclosure, a dryer appliance is provided including a cabinet, a drum rotatably mounted within the cabinet, the drum defining a chamber for receipt of clothes for drying, and an air handler for urging a flow of air through the chamber. A trap duct is in fluid communication with the chamber and a lint collection assembly operably coupled to the trap duct for filtering lint from the flow of air exiting the chamber. The lint collection assembly includes a filter housing defining an aperture through which the flow of air passes and a roller assembly including a supply roller for supplying a filter medium over the aperture and a collection roller for receiving the filter medium. A drive mechanism is operably coupled to the roller assembly for rotating the supply roller and the collection roller to move the filter medium over the aperture.

In another aspect of the present disclosure, a lint collection assembly for a dryer appliance is provided. The lint collection assembly includes a filter housing defining an aperture through which a flow of air passes and a roller assembly including a supply roller for supplying a filter medium over the aperture and a collection roller for receiving the filter medium. A drive mechanism is operably coupled to the roller assembly for rotating the supply roller and the collection roller to move the filter medium over the aperture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
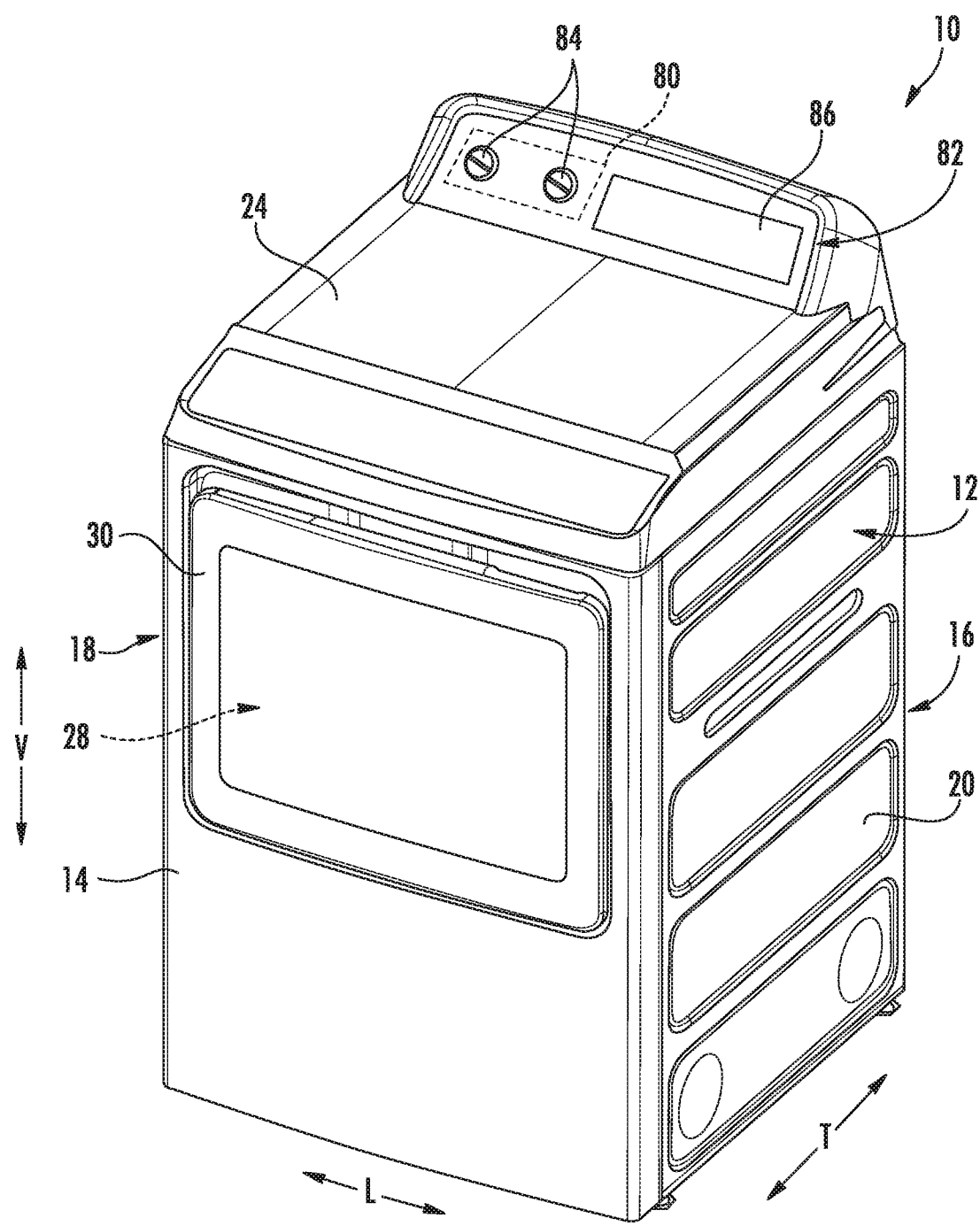
FIG. 1 provides a perspective view of a dryer appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
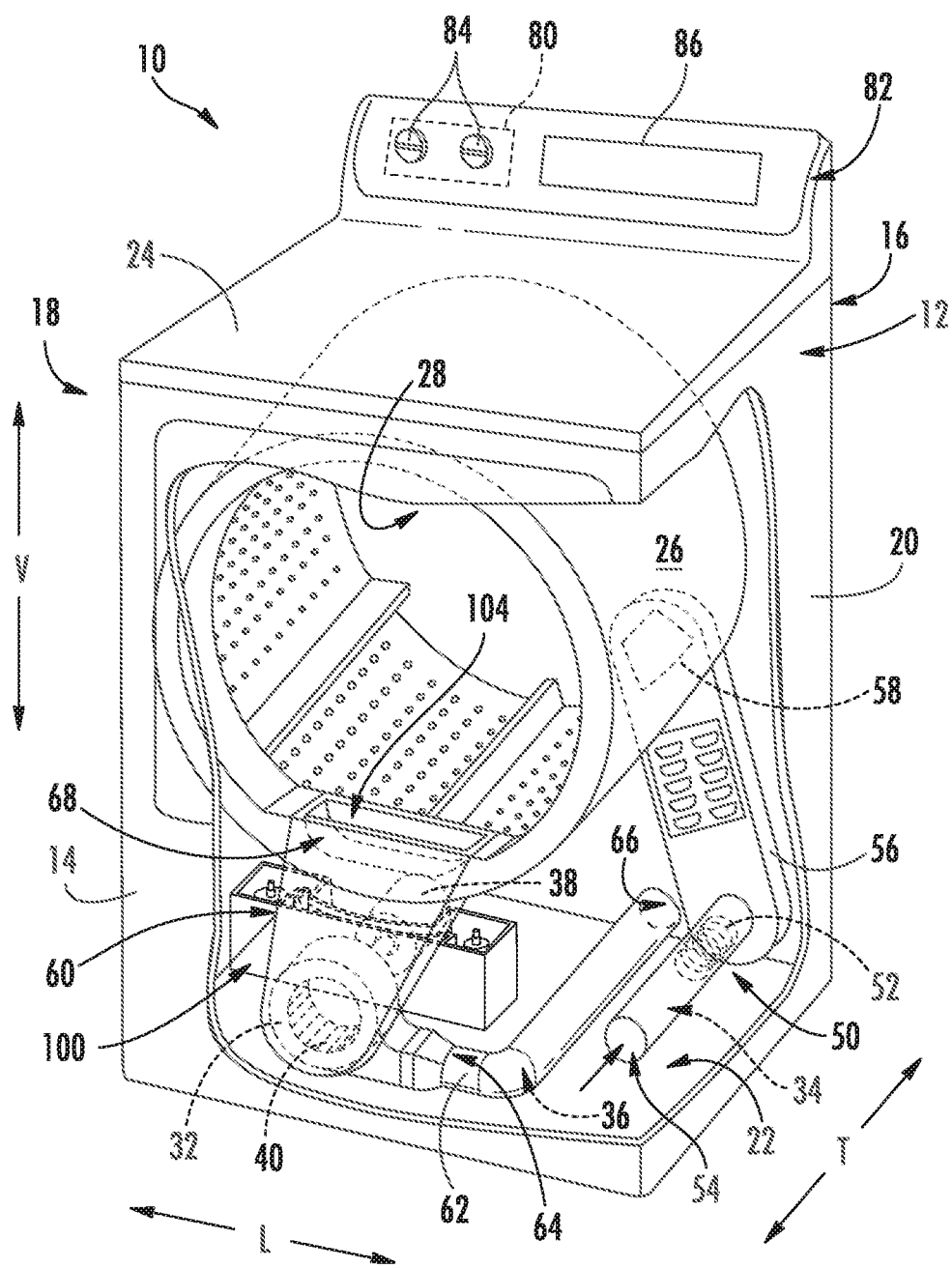
FIG. 2 provides a perspective view of the exemplary dryer appliance of FIG. 1 with portions of a cabinet of the exemplary dryer appliance removed to reveal certain components of the exemplary dryer appliance.
Figure 3:
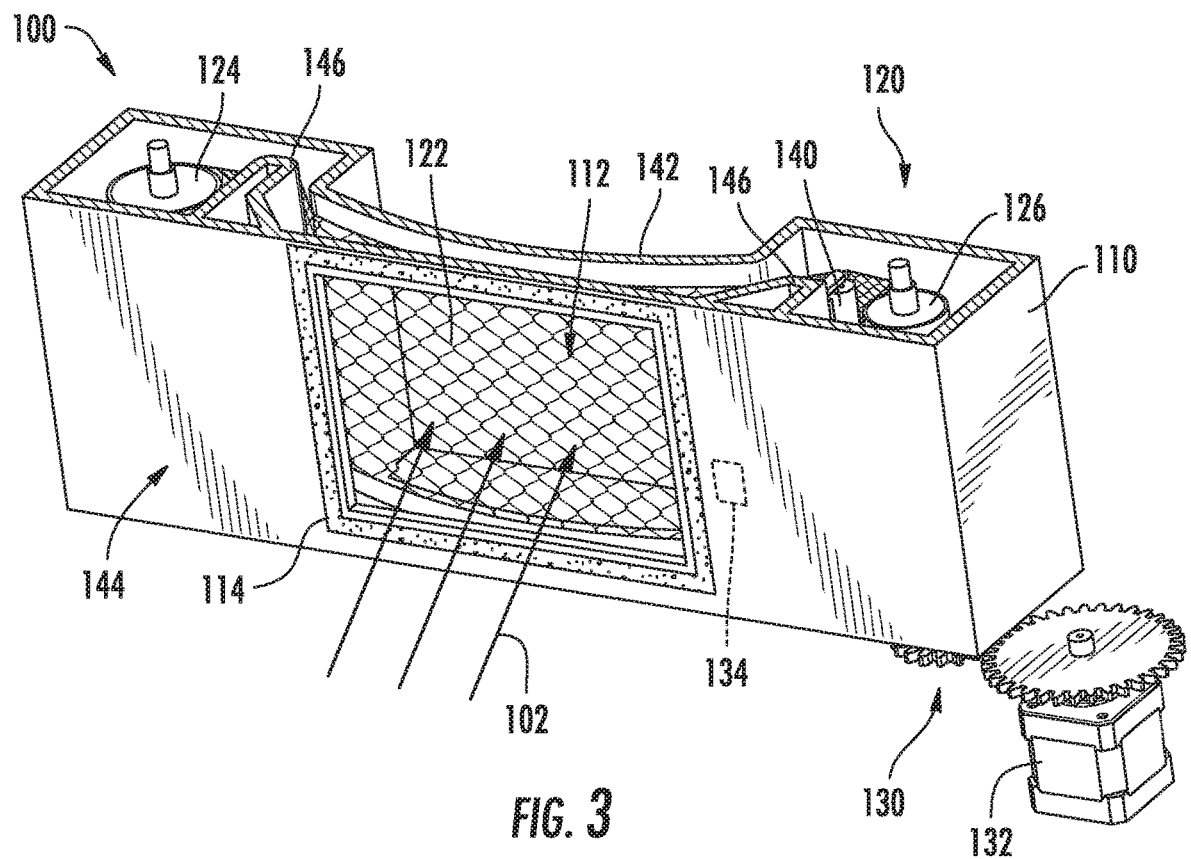
FIG. 3 provides a perspective view of a lint collection assembly that may be used with the exemplary dryer appliance of FIG. 1 according to an exemplary embodiment of the present subject matter.
Figure 4:
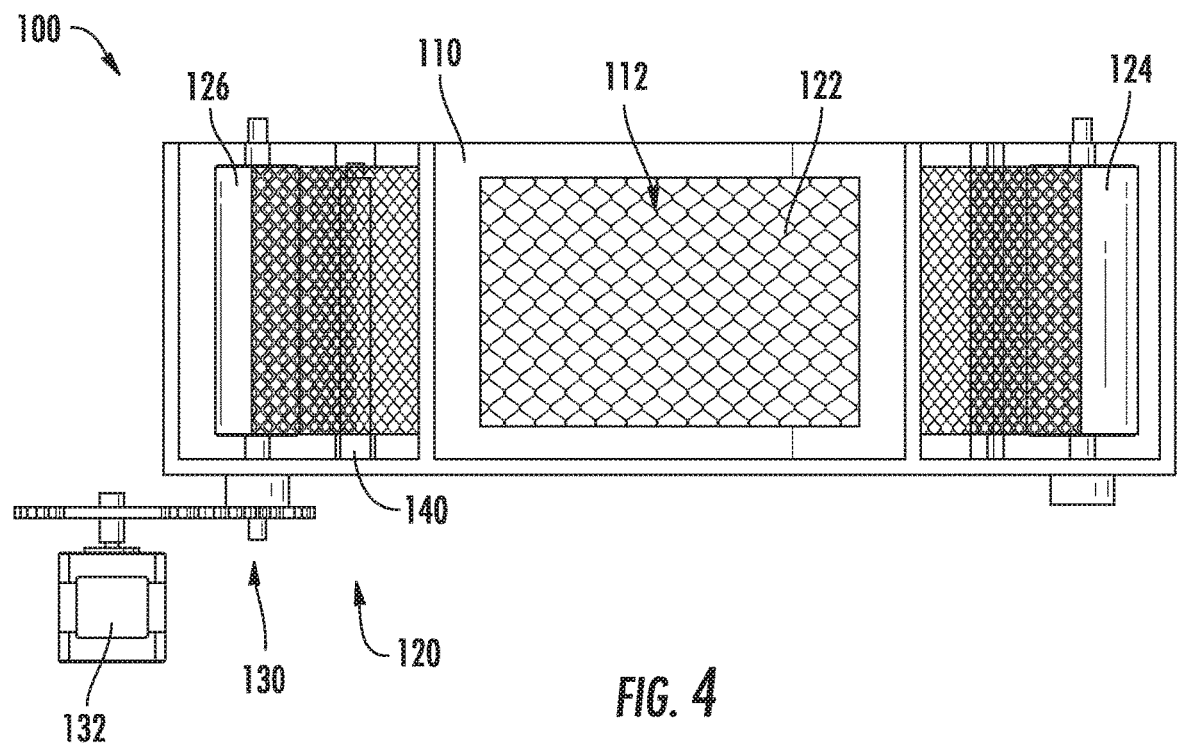
FIG. 4 provides a top view of the exemplary lint collection assembly of FIG. 3.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other dryer appliances having different appearances and different features may also be utilized with the present subject matter as well.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14, a rear panel 16, a pair of side panels 18 and 20 spaced apart from each other by front and rear panels 14 and 16, a bottom panel 22, and a top cover 24. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. A door 30 is rotatably mounted to cabinet 12 for providing selective access to drum 26.

An air handler 32, such as a blower or fan, may be provided to motivate an airflow (not shown) through an entrance air passage 34 and an air exhaust passage 36. Specifically, air handler 32 may include a motor 38 which may be in mechanical communication with a blower fan 40, such that motor 38 rotates blower fan 40. Air handler 32 is configured for drawing air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26.

Drum 26 may be configured to receive heated air that has been heated by a heating assembly 50, e.g., in order to dry damp articles disposed within chamber 28 of drum 26. Heating assembly 50 includes a heater 52 that is in thermal communication with chamber 28. For instance, heater 52 may include one or more electrical resistance heating elements or gas burners, for heating air being flowed to chamber 28. As discussed above, during operation of dryer appliance 10, motor 38 rotates fan 40 of air handler 32 such that air handler 32 draws air through chamber 28 of drum 26. In particular, ambient air enters air entrance passage 36 defined by heating assembly 50 via a heater entrance 54 due to air handler 32 urging such ambient air into heater entrance 54. Such ambient air is heated within heating assembly 50 and exits heating assembly 50 as heated air. Air handler 32 draws such heated air through an air entrance passage 34, including an inlet duct 56, to drum 26. The heated air enters drum 26 through a drum inlet 58 of duct 56 positioned at a rear wall of drum 26.

Within chamber 28, the heated air can remove moisture, e.g., from damp articles disposed within chamber 28. This internal air flows in turn from chamber 28 through an outlet assembly positioned within cabinet 12. The outlet assembly generally defines an air exhaust passage 36 and includes a trap duct 60, air handler 32, and an exhaust conduit 62. Exhaust conduit 62 is in fluid communication with trap duct 60 via air handler 32. More specifically, exhaust conduit 62 extends between an exhaust inlet 64 and an exhaust outlet 66. According to the illustrated embodiment, exhaust inlet 64 is positioned downstream of and fluidly coupled to air handler 32, and exhaust outlet 66 is defined in rear panel 16 of cabinet 12. During a drying cycle, internal air flows from chamber 28 through trap duct 60 to air handler 32, e.g., as an outlet flow portion of airflow. As shown, air further flows through air handler 32 and to exhaust conduit 62.

The internal air is exhausted from dryer appliance 10 via exhaust conduit 62. In some embodiments, an external duct (not shown) is provided in fluid communication with exhaust conduit 62. For instance, the external duct may be attached (e.g., directly or indirectly attached) to cabinet 12 at rear panel 16. Any suitable connector (e.g., collar, clamp, etc.) may join the external duct to exhaust conduit 62. In residential environments, the external duct may be in fluid communication with an outdoor environment (e.g., outside of a home or building in which dryer appliance 10 is installed). During a drying cycle, internal air may thus flow from exhaust conduit 62 and through the external duct before being exhausted to the outdoor environment.

In exemplary embodiments, trap duct 60 may include a filter portion 68 which includes a screen lint filter, a lint filtering and collection assembly such as described below, or another suitable device for removing lint and other particulates as internal air is drawn out of chamber 28. The internal air is drawn through filter portion 68 by air handler 32 before being passed through exhaust conduit 62. After the clothing articles have been dried (or a drying cycle is otherwise completed), the clothing articles are removed from drum 26, e.g., by accessing chamber 28 by opening door 30.

Referring again to FIGS. 1 and 2, dryer appliance 10 is further equipped with a controller 80 for regulating operation of dryer appliance 10. Controller 80 may include one or more memory devices and one or more microprocessors, such as general or special purpose microprocessors operable to execute programming instructions or micro-control code associated with an appliance operating cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 80 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Typically, dryer appliance 10 includes a cabinet backsplash 82 with a user panel/controls 84 mounted thereon. A user may manipulate user interface 84 to select various operational features/modes and monitor progress of dryer appliance 10. In one embodiment, user interface 84 may represent a general purpose I/O ("GPIO") device or functional block. In one embodiment, user interface 84 may include input components, such as one or more of a variety of electrical, mechanical or electro-mechanical input devices including rotary dials, push buttons, and touch pads. User interface 84 may include a display component 86, such as a digital or analog display device designed to provide operational feedback to a user. Display 86 may be in communication with controller 80, and may display information in response to signals from controller 80.

Controller 80 may be positioned in a variety of locations throughout dryer appliance 10. In the illustrated embodiment, controller 80 may be located within cabinet backsplash 82. In such an embodiment, input/output ("I/O") signals may be routed between the control system and various operational components of dryer appliance 10 along wiring harnesses that may be routed throughout dryer appliance 10. For example, user interface 84 and display 86 may be in communication with the controller 80 via one or more signal lines or shared communication busses.

Referring now generally to FIGS. 3 through 7, a lint collection assembly 100 that may be used with dryer appliance 10 will be described according to an exemplary embodiment of the present subject matter. Specifically, lint collection assembly 100 is operably coupled to trap duct 60 for filtering lint, debris, and other particulates out of the flow of air (e.g., identified by arrows 102) which is exiting the chamber 28. Moreover, as will be described in detail below, lint collection assembly 100 is designed to minimize manual filter cleaning by periodically collecting used filter screen with collected lint and replacing a clean portion of filter screen over an aperture through which the flow of air 102 passes.

As best shown in FIG. 2, lint collection assembly 100 is positioned on trap duct 60 between a chamber outlet 104 and air handler 32. While it is desirable to position lint collection assembly 100 upstream of air handler 32, it should be appreciated that the configuration and position described herein is used only to explain aspects of the present subject matter. Variations and modifications may be made to the position, configuration, operation, and other features of lint collection assembly 100 while remaining within the scope of the present subject matter.

As illustrated in FIGS. 3 through 7, lint collection assembly 100 includes a filter housing 110 which is positioned at least in part in trap duct 60 and defines an aperture 112 through which the flow of air 102 passes from chamber outlet 104 to air handler 32. Specifically, filter housing 110 may be a substantially enclosed housing having aperture 112 defined through a front and rear side. According to exemplary embodiments, any suitable gasket 114 (see, e.g., FIG. 3, such as a filter gasket or resilient gasket) may be positioned on filter housing 110 around each aperture 112 for generating an airtight or fluid tight seal between trap duct 60 and filter housing 110.

Figure 5:
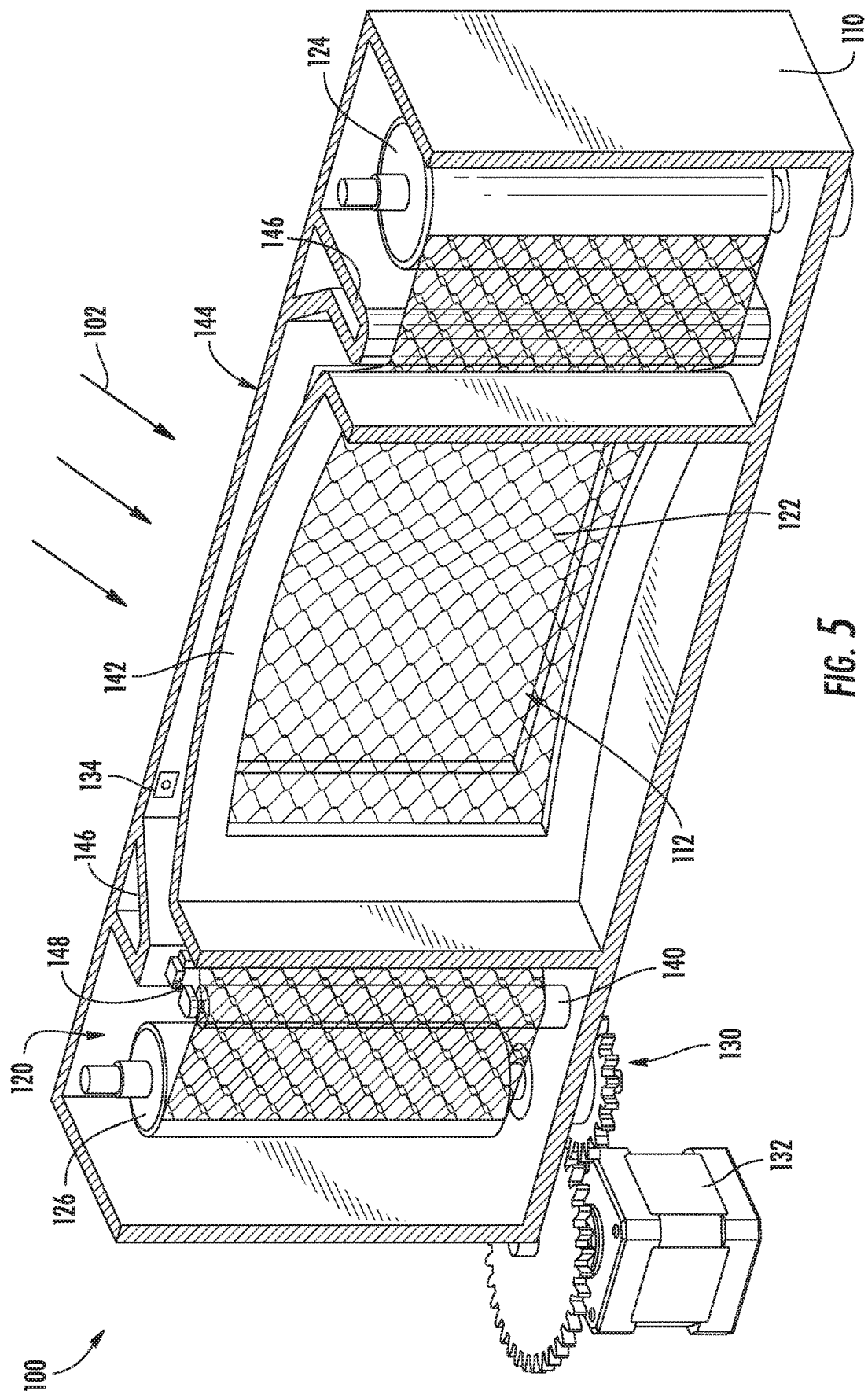
FIG. 5 provides a rear cross sectional view of the exemplary lint collection assembly of FIG. 3.

Lint collection assembly 100 further includes a roller assembly 120 that is positioned within filter housing 110 and is generally configured for selectively positioning a filter medium 122 over aperture 112, e.g., for filtering lint from the flow of air 102. Specifically, roller assembly 120 includes a supply roller 124 which contains a length of clean, unused, or otherwise lint-free filter medium 122. In addition, roller assembly 120 includes a collection roller 126 which may contain filter medium 122 which is dirty, used, or has otherwise passed over aperture 112. Thus, as best shown in FIG. 5, filter medium 122 may include a roll of mesh screen formed from metal, polymer, or any other suitable material. Supply roller 124 may unroll a fresh portion of filter medium 122 when desired while collection roller 126 simultaneously winds up the used filter medium 122 and the lint collected thereon.

According to the illustrated embodiment, supply roller 124 and collection roller 126 are positioned on opposite sides of aperture 112 along the lateral direction L. In addition, supply roller 124 and collection roller 126 are rotatable about shafts mounted along the vertical direction V. In this manner, trap duct 60 may be routed down from chamber outlet 104 before the flow of air 102 is turned to pass through aperture 112 and filter medium 122 before trap duct 60 routes the flow of air 102 back down toward air handler 32. It should be appreciated that according to alternative embodiments, trap duct 60 may be configured in any other suitable manner and filter housing 110 may be positioned at any suitable location and in any suitable configuration relative to trap duct 60.

In addition, according to an exemplary embodiment, front panel 14 of cabinet 12 may define a filter opening (not shown) for accessing a filter slot (not shown) that extends over or provides access to aperture 112 or lint collection assembly 100 generally. In this regard, the filter opening and filter slot may be similar to those openings found on conventional dryer appliances for positioning a manually replaceable filter. Thus, if a user of dryer appliance 10 did not wish to purchase or install a lint collection assembly 100 as described herein, the user can still use conventional manual filters which must be cleaned between cycles.

Lint collection assembly 100 may further include a drive mechanism 130 which is operably coupled to roller assembly 120 is generally configured for rotating supply roller 124 and collection roller 126 to move filter medium 122 over aperture 112. For example, according to the embodiment illustrated in FIGS. 3 through 7, drive mechanism 130 includes a motor 132 mechanically coupled to collection roller 126 and being configured to selectively rotate collection roller 126 to wind up a used section of filter medium 122 and to position a clean section of filter medium 122 over aperture 112.

As used herein, "motor" may refer to any suitable drive motor and/or transmission assembly for rotating roller assembly 120. For example, motor 132 may be a brushless DC electric motor, a stepper motor, or any other suitable type or configuration of motor. Alternatively, for example, motor 132 may be an AC motor, an induction motor, a permanent magnet synchronous motor, or any other suitable type of AC motor. In addition, motor 132 may include any suitable transmission assemblies, clutch mechanisms, or other components. Motor 132 and may be in operative communication with controller 80 such that controller 80 may be configured to selectively operate motor 132 when desired.

In operation, after each drying cycle or after a predetermined filter usage time at which filter medium 122 is filled or reaches a threshold lint magnitude, collection roller 126 may be driven by motor 132 to wind up the used filter medium 122 while simultaneously compressing the lint collected thereon onto collection roller 126. According to exemplary embodiments, motor 132 may be configured for driving collection roller 126 to achieve a suitable number of roller rotations to wind up the desired section of filter medium 122.

Notably, as the diameter of filter medium 122 and the lint collected thereon builds throughout the roll of filter media 122, motor 132 will need to make fewer rotations to wind up the same length of filter medium 122. According to one exemplary embodiment, because the thickness of collected lint and the thickness of filter medium 122 are relatively known or constant values, controller 80 may be programmed to know the amount of rotation needed to wind up the desired length of filter medium 122 based on the amount of filter medium 122 on supply roller 124 and collection roller 126. For example, the desired rotation or motor 132 operating time may be preprogrammed into a lookup table used by controller 80.

According to still alternative embodiments, lint collection assembly 100 may include a lint detection sensor 134 for detecting a magnitude, thickness, presence, or other quantitative or qualitative values of collected lint on filter medium 122, e.g., to determine when a fresh section of filter medium 122 is needed, and when motor 132 has been driven long enough to fully wind up the used section of filter medium 122. In general, lint detection sensor 134 may be any suitable type, position, or configuration of sensors or devices suitable for detecting lint as described above. For example, lint detection sensor 134 may be a light sensor, an optical sensor, a tactile sensor, an acoustic sensor, a capacitive sensor, an ultrasonic sensor, etc.

Notably, in order to prevent the flow of air 102 from leaking around filter medium 122, to ensure that lint is collected on a particular region of filter medium 122, and to secure the position of filter medium 122, it may be desirable to ensure that filter medium 122 is pulled tight or otherwise placed in tension both during the lint collection process (e.g., during an drying cycle) and during the winding/unwinding of filter medium 122. Accordingly, lint collection assembly 100 may include several features for maintaining tension of filter medium 122.

Figure 6:
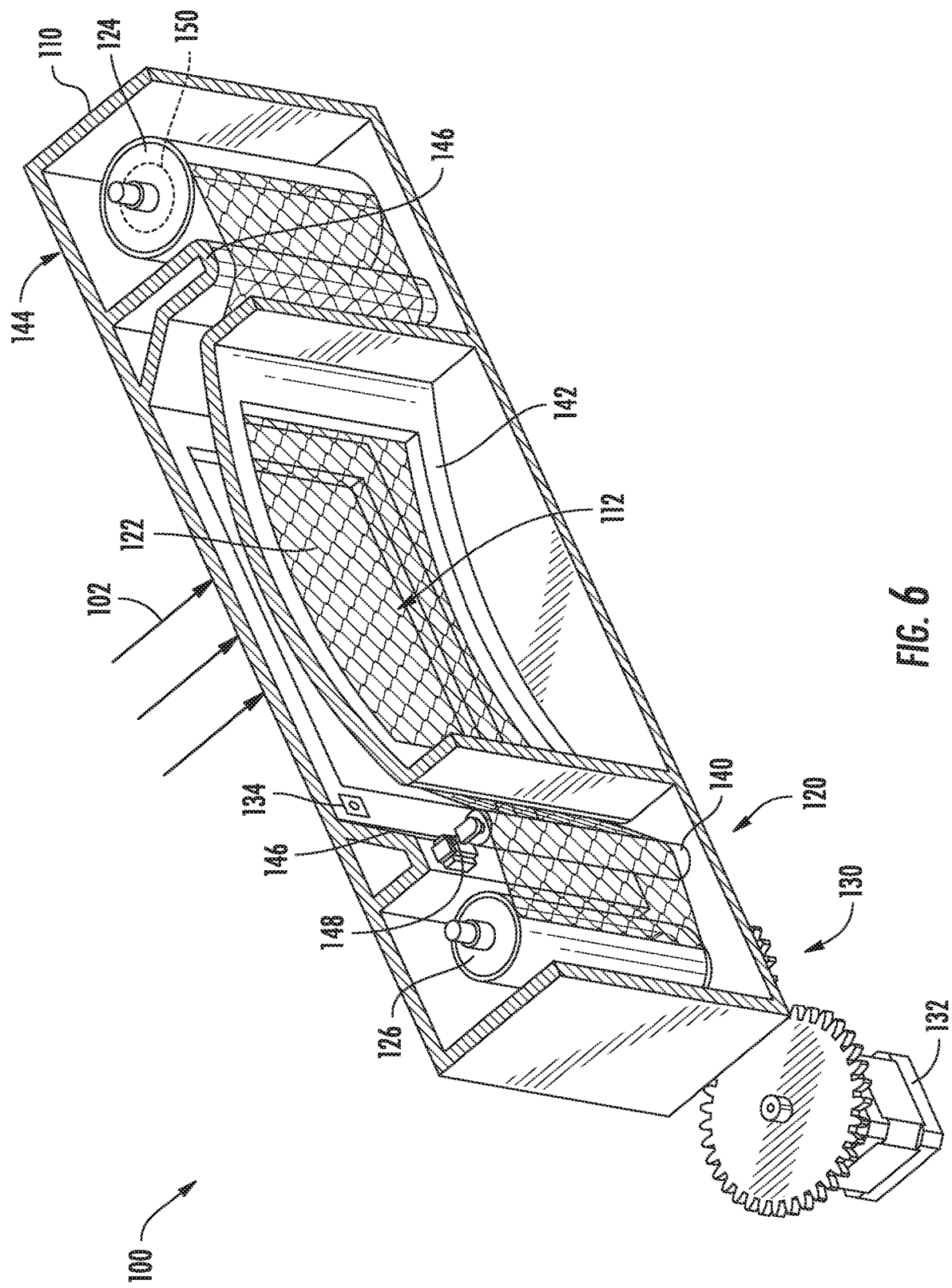
FIG. 6 provides another cross sectional view of the exemplary lint collection assembly of FIG. 3.
Figure 7:
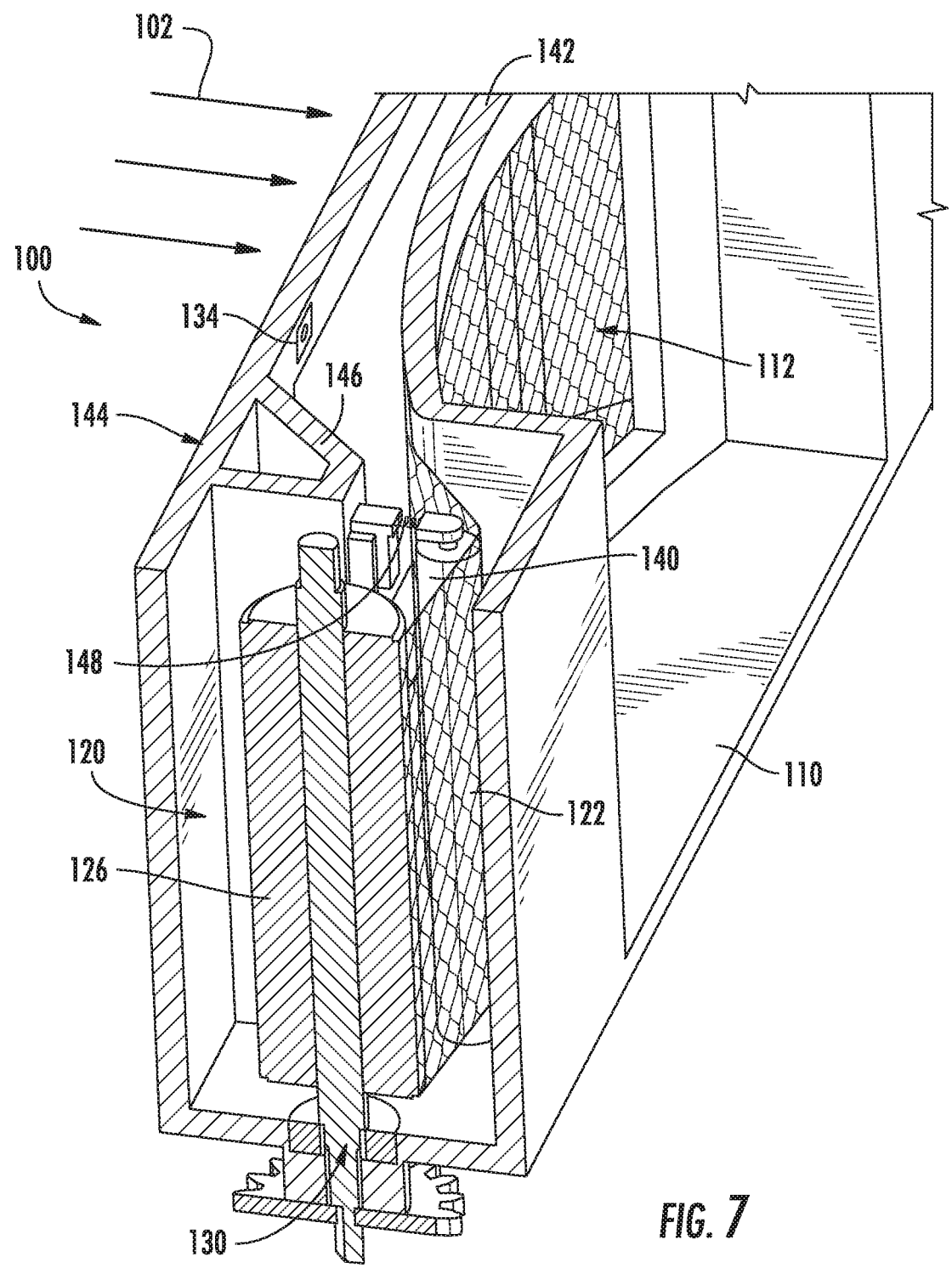
FIG. 7 provides another cross sectional view of the exemplary lint collection assembly of FIG. 3.

For example, lint collection assembly 100 may include a tensioning roller 140 which is in contact with filter media 122 for urging filter medium 122 against filter housing 110 over aperture 112. For example, as best illustrated in FIG. 6, the housing 110 may define a curved support 142 positioned in a downstream end of filter housing 110 and defining the downstream aperture 112. In addition, filter housing 110 may define an upstream wall 144 defining an upstream aperture 112 and protruding walls 146 that extend toward the downstream end and past curved support 142. As illustrated, positioned at the distal end of one of protruding walls 146 is tensioning roller 140, which is positioned at a desired depth to ensure a tortuous or curved path of filter medium 122 in order to stretch or tension filter medium 122 across curved support 142.

According still other embodiments, and as shown for example schematically in FIG. 6, lint collection assembly 100 may further include a biasing member 148 for urging tensioning roller 140 against filter medium 122 to provide tension to filter medium 122 over aperture 112. For example, according to the illustrated embodiment, biasing member 148 is a mechanical spring, but could alternatively be one or more magnet pairs (e.g., permanent magnets or electromagnets), linear actuators, piezoelectric actuators, etc.

In addition, lint collection assembly 100 may include a friction clutch 150 mechanically coupled to supply roller 124 to maintain tension on filter medium 122. In this regard, friction clutch 150 may be any mechanism suitable for resisting rotation supply roller 124 in order to prevent freewheeling and create rotational resistance which places tension on filter medium 122 as collection roller 126 winds up or pulls filter medium 122 across aperture 112.

Figure 8:
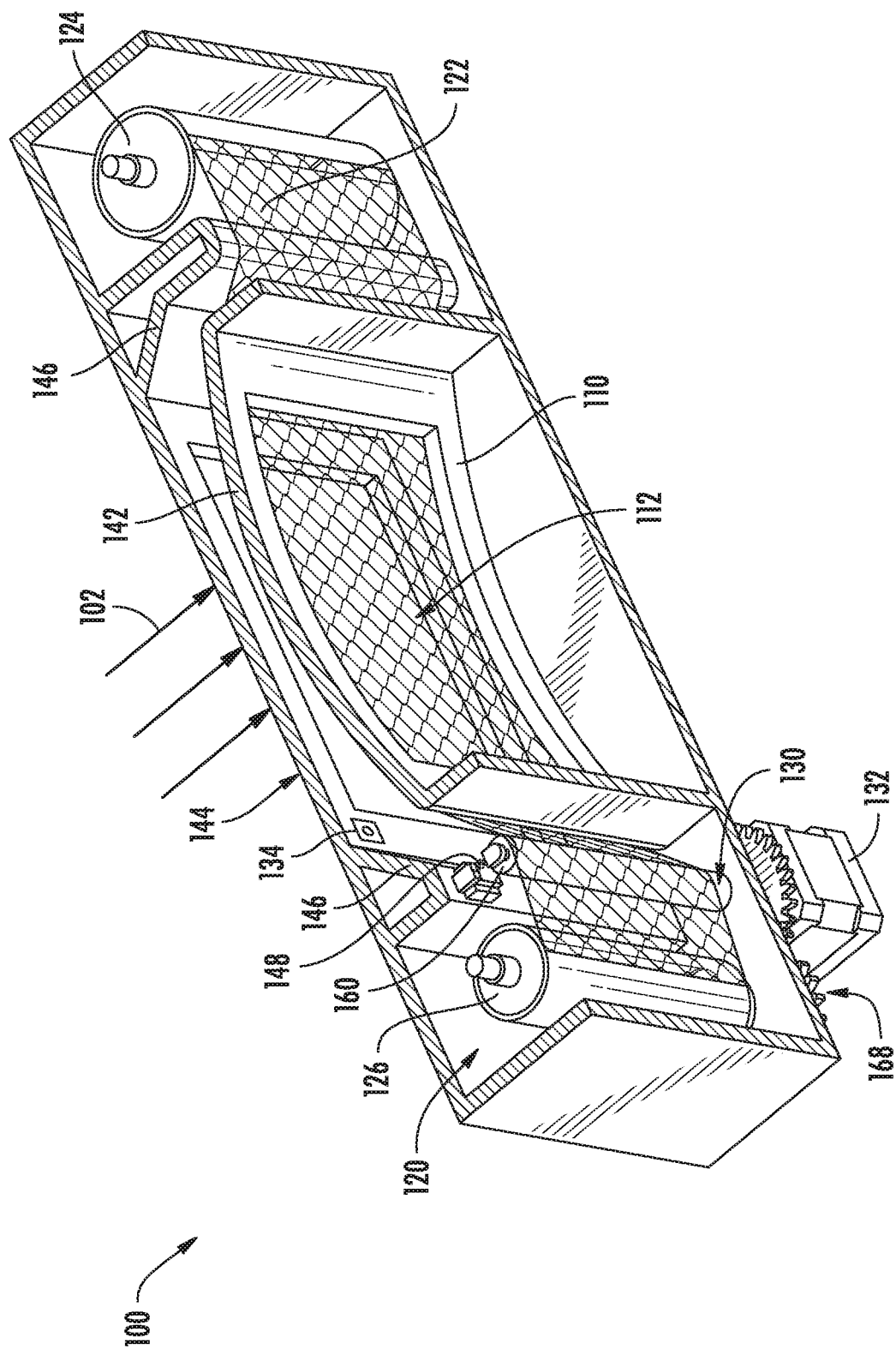
FIG. 8 provides a cross sectional view of an exemplary lint collection assembly that may be used with the exemplary dryer appliance of FIG. 1 according to another exemplary embodiment of the present subject matter.
Figure 9:
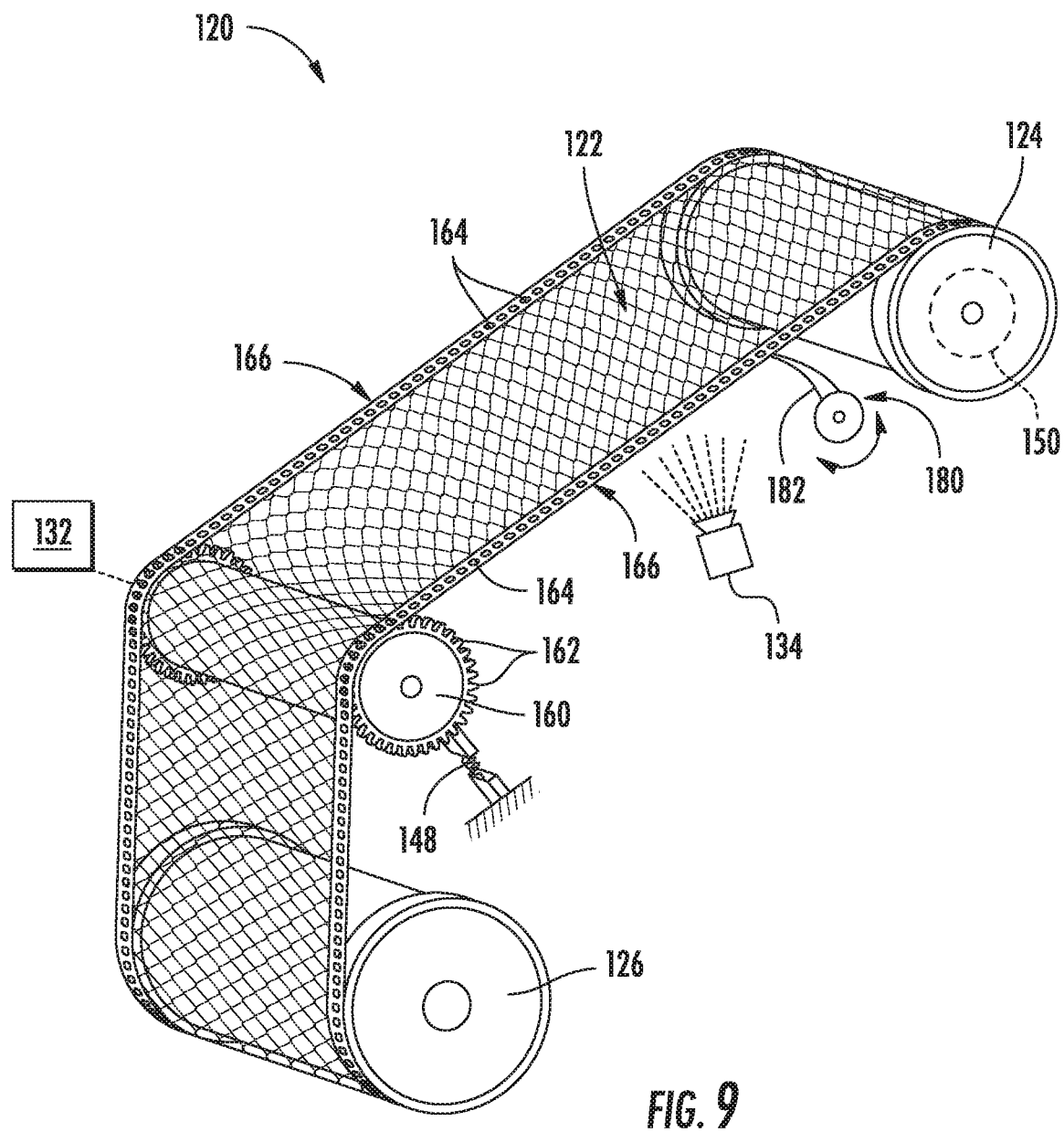
FIG. 9 provides a schematic representation of the exemplary lint collection assembly of FIG. 8.

Referring now to FIGS. 8 and 9, a lint collection assembly 100 will be described according to an alternative embodiment of the present subject matter. More specifically, the embodiment shown in FIGS. 8 and 9 is similar in many respects to that described previously except that the drive mechanism 130 is different, as described below. Thus, similar reference numerals will be used to refer to like features between the two embodiments.

As illustrated, lint collection assembly 100 includes a drive roller 160 which is positioned similarly to tensioning roller 140. In this regard, drive roller 160 is positioned between supply roller 124 and collection roller 126 and is operably coupled to filter medium 122. However, motor 132 is mechanically coupled to drive roller 160 (e.g., instead of collection roller 126) for selectively rotating drive roller 160 to move filter medium 122 off of supply roller 124 and onto collection roller 126. Similar to tensioning roller 140, a biasing member 148 may be used to urge drive roller 160 against filter medium 122 to provide tension to filter medium 122 over aperture 112.

Moreover, as best illustrated in FIG. 9, drive roller 116 may include a plurality of radially extending teeth 162 which are configured for engaging a plurality of holes 164 spaced down the sides 166 of filter medium 122 along the length of filter medium 122. In this manner, as drive roller 160 is rotated by motor 132, teeth 162 on drive roller 160 engage holes 164 and filter medium 122 to move filter medium 122 from supply roller 124 to collection roller 126. Notably, because the diameter of drive roller 160 does not change as filter medium 122 is wound and unwound, controller 80 may know to rotate drive roller 160 a specific number of rotations to achieve the desired linear movement of filter medium 122. In this manner, for example, complex motor control algorithms and sensors such as lint detection sensors 134 may not be necessary. In order to ensure collection roller 126 rotates to collect filter medium 122 as it is pushed along by drive roller 160, a gear assembly 168 may be used to mechanically couple drive roller 160 or motor 132 to collection roller 126.

Whether roller assembly 120 is driven by collection roller 126 or drive roller 160, lint collection assembly 100 may simplify the manner in which lint is collected from the flow of air 102, thereby minimizing user interaction, improving dryer performance, etc. Specifically, a fresh section of filter medium 122 is positioned over aperture 112 until a sufficient amount of lint has been collected (e.g., over a single operating cycle). Collection roller 126 and/or drive roller 160 may then pull filter medium 122 off of supply roller 124 until a new section of filter medium 122 is positioned over aperture 112, and the process is repeated. Notably, the lint collected on filter medium is wrapped tightly against collection roller 126 and is compressed which may reduce storage requirements, improve dryer performance, and simplify cleaning.

Notably, lint collection assembly 100 may operate for many drying cycles before any user interaction is needed, e.g., 25, 50, or even 100 drying cycles. After all filter medium 122 on supply roller 124 is exhausted, it is desirable that lint collection assembly 100 be replaced, replenished, or reverse while removing the collected lint such that fresh screen may be supplied over aperture 112 once again. According to an exemplary embodiment of the present subject matter, e.g., illustrated best in FIG. 9, lint collection assembly 100 may include a cleaning mechanism 180 for removing collected lint from a used section of filter medium 122.

As illustrated, cleaning mechanism 180 may be positioned proximate supply roller 124 and may be operable to engage the used section of filter medium 122 when filter medium 122 is moved away from aperture 112 in a reverse direction (e.g. from collection roller 126 toward supply roller 124). In this regard, cleaning mechanism 180 may be pivotally mounted to filter housing 110 such that it is movable between a disengaged and an engaged position. As such, when the rotation of roller assembly 120 is reversed after supply roller 124 is empty, cleaning mechanism 180 may pivot into the engaged position where it contacts filter medium 122 to remove collected lint from filter medium 122 as it is rewound on to supply roller 124. For example, according to the illustrated embodiment, cleaning mechanism 180 is an elongated blade 182 that extends along the length of filter housing 110 and contacts filter medium 122 to scrape off collected lint as it is moved in the reverse direction. According still other embodiments, cleaning mechanism 180 may be a hook, a wire brush, a vacuum assembly, a compressed air supply, or any other suitable device for removing collected lint from filter medium 122.

Lint collection assembly 100 is described below according to an exemplary embodiment of the present subject matter. However, it should be appreciated that the exemplary functions and configurations of lint collection assembly 100 provided herein are used only as examples to facilitate description of aspects of the present subject matter. System configurations may vary, other duct configurations or roller assemblies may be used, other system configurations may be implemented, etc. These variations, modifications, and other applications are contemplated as within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dryer appliance comprising:
   a cabinet;
   a drum rotatably mounted within the cabinet, the drum defining a chamber for receipt of clothes for drying;
   an air handler for urging a flow of air through the chamber;
   a trap duct in fluid communication with the chamber; and
   a lint collection assembly operably coupled to the trap duct for filtering lint from the flow of air exiting the chamber, the lint collection assembly comprising:
      a filter housing defining an aperture through which the flow of air passes;
      a roller assembly comprising a supply roller for supplying a filter medium over the aperture and a collection roller for receiving the filter medium; and
      a drive mechanism operably coupled to the roller assembly for rotating the supply roller and the collection roller to move the filter medium over the aperture.

2. The dryer appliance of claim 1, wherein the drive mechanism comprises:
   a motor mechanically coupled to the collection roller, the motor configured for selectively rotating the collection roller to wind up a used section of the filter medium and position a clean section of the filter medium over the aperture.

3. The dryer appliance of claim 2, wherein the lint collection assembly further comprises:
   a tensioning roller in contact with the filter medium for urging the filter medium against the filter housing over the aperture.

4. The dryer appliance of claim 3, wherein the lint collection assembly comprises:
   a biasing member for urging the tensioning roller against the filter medium to provide tension to the filter medium over the aperture.

5. The dryer appliance of claim 1, wherein the lint collection assembly further comprises:
   a drive roller positioned between the supply roller and the collection roller and being operably coupled to the filter medium; and
   a motor mechanically coupled to the drive roller for selectively rotating the drive roller to move the filter medium off of the supply roller and onto the collection roller.

6. The dryer appliance of claim 5, wherein the lint collection assembly comprises:
   a biasing member for urging the drive roller against the filter medium to provide tension to the filter medium over the aperture.

7. The dryer appliance of claim 5, wherein the filter medium defines a plurality of holes spaced down sides of the filter medium along a length of the filter medium, and wherein the drive roller comprises teeth configured for engaging the plurality of holes to move the filter medium as the drive roller rotates.

8. The dryer appliance of claim 5, wherein the lint collection assembly further comprises:
   a gear assembly operably coupling the drive roller to the collection roller.

9. The dryer appliance of claim 5, wherein the lint collection assembly further comprises:
   a friction clutch mechanically coupled to the supply roller to resist rotation of the supply roller and tension the filter medium.

10. The dryer appliance of claim 1, wherein the lint collection assembly further comprises:
    a lint detection sensor for detecting a magnitude or presence of lint collected on the used section of the filter medium.

11. The dryer appliance of claim 10, wherein the lint detection sensor is a light sensor, an optical sensor, a tactile sensor, an acoustic sensor, a capacitive sensor, or an ultrasonic sensor.

12. The dryer appliance of claim 1, wherein the lint collection assembly further comprises:
    a cleaning mechanism for removing collected lint from a used section of the filter medium.

13. The dryer appliance of claim 12, wherein the cleaning mechanism is operable to engage the used section of the filter medium when the filter medium is moved away from the aperture.

14. The dryer appliance of claim 12, wherein the cleaning mechanism is pivotally mounted to the filter housing such that it is movable between a disengaged position and an engaged position.

15. The dryer appliance of claim 12, wherein the cleaning mechanism is an elongated blade, hook, or wire brush that is that is positioned proximate the supply roller, and wherein the supply roller may be rotated in reverse to clean the used section of the filter medium and rewind the filter medium onto the supply roll.

16. The dryer appliance of claim 1, wherein the filter medium is a roll of metal screen.

17. The dryer appliance of claim 1, wherein the supply roller and the collection roller are positioned on opposite sides of the aperture along a lateral direction.

18. The dryer appliance of claim 16, wherein the supply roller and the collection roller are rotatable about a vertical direction.

19. A lint collection assembly for a dryer appliance, the lint collection assembly comprises:
    a filter housing defining an aperture through which a flow of air passes;

a roller assembly comprising a supply roller for supplying a filter medium over the aperture and a collection roller for receiving the filter medium;

a drive mechanism operably coupled to the roller assembly for rotating the supply roller and the collection roller to move the filter medium over the aperture;

a drive roller positioned between the supply roller and the collection roller and being operably coupled to the filter medium; and a motor mechanically coupled to the drive roller for selectively rotating the drive roller to move the filter medium off of the supply roller and onto the collection roller.

20. The lint collection assembly of claim 19, wherein the drive mechanism comprises:

a motor mechanically coupled to the collection roller, the motor configured for selectively rotating the collection roller to wind up a used section of the filter medium and position a clean section of the filter medium over the aperture; and a tensioning roller in contact with the filter medium for urging the filter medium against the filter housing over the aperture.

\* \* \* \* \*